(12) United States Patent
Gettemy et al.

(10) Patent No.: US 6,718,115 B1
(45) Date of Patent: Apr. 6, 2004

(54) PERSONAL DIGITAL ASSISTANT DISPLAY ILLUMINATION METHOD AND SYSTEM

(75) Inventors: Shawn Gettemy, San Jose, CA (US); Rajiv Pethe, San Jose, CA (US)

(73) Assignee: palmOne, Inc., Milpitas, CA (US)

( * ) Notice: Subject to any disclaimer, the term of this patent is extended or adjusted under 35 U.S.C. 154(b) by 17 days.

(21) Appl. No.: 09/675,909

(22) Filed: Sep. 29, 2000

(51) Int. Cl.$^7$ .............................. G09F 13/00; G02B 6/00
(52) U.S. Cl. ...................... 385/147; 385/901; 362/551
(58) Field of Search .................... 385/901, 116, 385/119, 120, 147, 42; 362/551, 577, 559, 560; 90/547

(56) References Cited

U.S. PATENT DOCUMENTS

| | | | |
|---|---|---|---|
| 5,097,396 A | * 3/1992 | Myers | 362/551 |
| 6,272,269 B1 | * 8/2001 | Naum | 362/551 |
| 6,296,383 B1 | * 10/2001 | Henningsen | 362/551 |
| 6,351,260 B1 | * 2/2002 | Graham et al. | 345/104 |
| 6,443,585 B1 | * 9/2002 | Saccomanno | 385/901 |
| 6,481,864 B2 | * 11/2002 | Hosseini et al. | 385/901 |

* cited by examiner

*Primary Examiner*—Georgia Epps
*Assistant Examiner*—Alicia M. Harrington
(74) *Attorney, Agent, or Firm*—Wagner, Murabito & Hao LLP

(57) ABSTRACT

The present invention system and method facilitates efficient and relatively even distribution of illumination throughout a display screen. The system and method also facilitates clearer presentation of images, size reductions and conservation of limited power resources in handheld computers. In one embodiment of the present invention, a display illumination distribution system includes a light pipe, a lens, a wave-guide array and a light source. The light sources provides light waves that are directed along the wave guide array to the lens which directs the light waves into the light pipe. The light pipe conveys the light to the display and provides illumination. The routing of light through the wave-guide array confines the light waves to a wave guide and reduces the number of light waves that miss the light pipe.

8 Claims, 15 Drawing Sheets

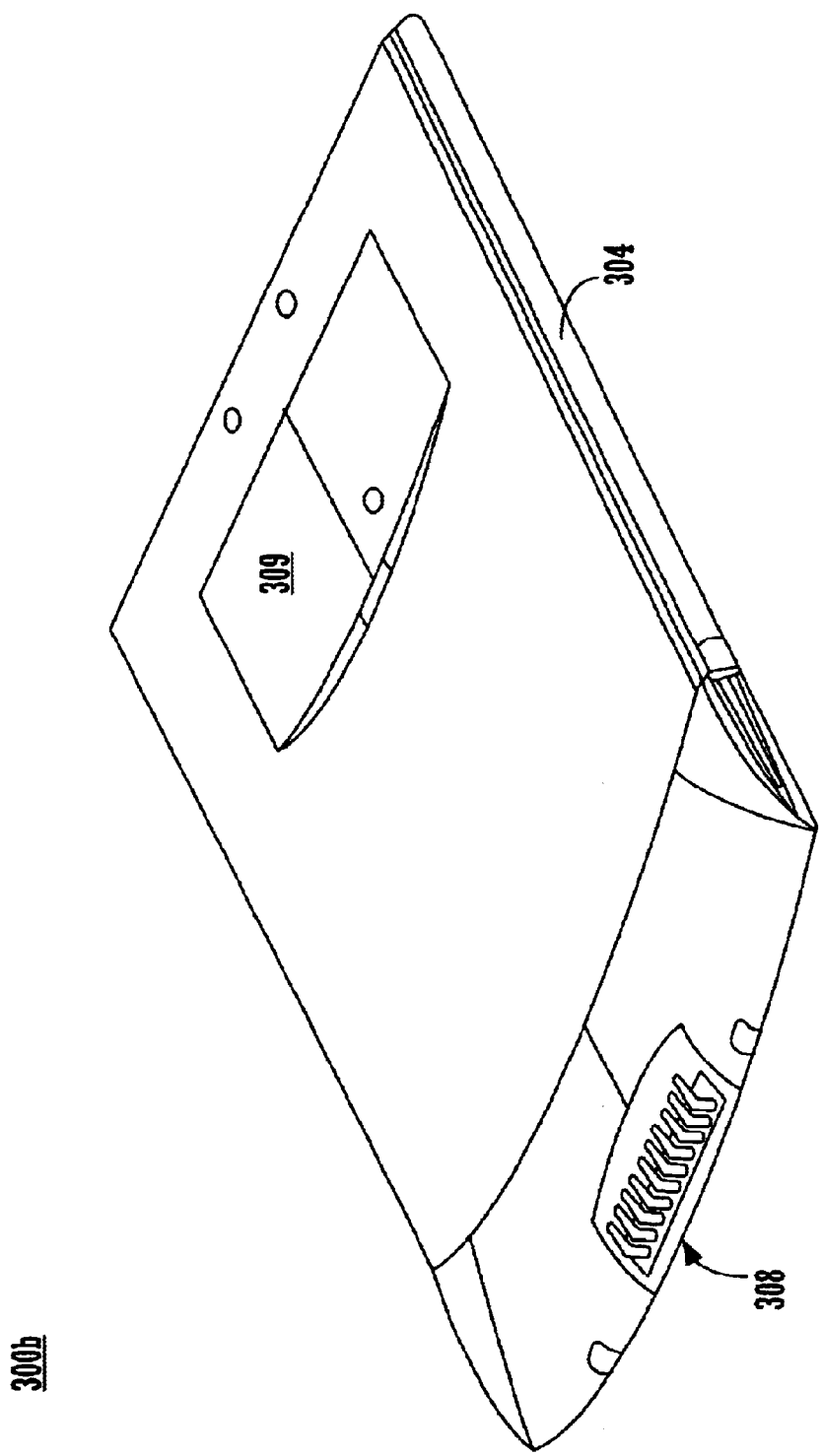

PERSONAL DIGITAL ASSISTANT DISPLAY ILLUMINATION METHOD AND SYSTEM

BACKGROUND OF THE INVENTION

1. Field of the Invention

This invention relates to the field of handheld computers and display illumination. In particular, the present invention relates to an efficient personal digital assistant display illumination system and method that is easily adaptable to integrate touchpad capability.

2. Related Art

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reductions in analyzing and communicating data, ideas and trends in most areas of business, science, education and entertainment. Electronic systems designed to produce these results often include electronic displays, such as a portable handheld computer display screen. Traditional display screen illumination techniques in a handheld computer usually result in uneven and inefficient illuminating of a presentation on the display screen.

Typically, the primary function of a display screen is to provide a clear and readily viewable presentation to a user. One of the most important factors affecting a users ability to easily perceive the shapes or images of a presentation is sufficient illumination of the display screen. Ambient light is often insufficient to provide adequate illumination of a display screen and a display screen usually includes lighting provisions such as a backlight. Effective distribution of light from a light source to the display screen significantly impacts the clarity of a display screen presentation.

Traditional computer display illumination techniques often provide light from a single source onto a light pipe and rely on the light pipe to function as a distribution medium. While a light pipe does provide some beneficial distribution characteristics, light emanating from a single source usually does not get distributed evenly through a light pipe and some areas of a display screen often appear significantly darker than other areas. It is usually more appealing to have an evenly illuminated display screen. Evenly illuminated display screens usually provide a more pleasant viewing experience without significant contrasts. Traditional illumination attempts sometimes rely on a relatively large light source that consumes considerable energy and while it may increase illumination to darker areas of a display screen it usually does not solve contrast problems because some areas of the display screen still typically appear very bright compared to others. FIG. 1 shows an illumination display pattern of a prior art display screen in which areas 111, 112 and 121 are darker than 107 which is darker than 105. Light waves from light source 131 that travel some distance (e.g., 195) to the light pipe 145 often miss the light pipe and are absorbed by the device body 150.

As the components required to build a computer system have reduced in size, new categories of computer systems have emerged. One of the new categories of computer systems is the hand held or "palmtop" computer system. A palmtop computer system is a computer that is small enough to be held in the hand of a user and is often "palm-sized." Most palmtop computer systems are used as Personal Digital Assistants (PDAs) to implement various Personal Information Management (PIM) applications such as an address book, a daily organizer, and electronic notepads, to name a few. Even though palmtop computer systems are very small, they typically provide diverse functionality and their capabilities are constantly increasing. Display capabilities of handheld computers are becoming increasingly important and due to the relatively small size of the display in a handheld computer it is important for the presentation to be clear and well illuminated.

The relatively small size of a typical handheld computer increases the difficulty of accomplishing a number of operations, including illuminating a display. Typically, the compactness of a handheld computer limits the size of a light source and it is important to effectively utilize the limited light emissions. A light pipe in a handheld computer is usually so thin that significant portions of the light generated by a light source miss the light pipe and are absorbed by relatively non reflective materials that form other portions of the hand held computer.

Efficient distribution of light to a display usually facilitates significant improvements in display presentations. Typically, the more efficiently light is delivered to a display the clearer the presentation of shapes and images and the more pleasurable the viewing experience is for a user. Efficient lighting of a display also permits a smaller light source and a smaller light source consumes less of the limited energy supply most portable handheld computers rely on to supply power. Displays that are easy to view and smaller components (such as a light source or battery) facilitate palmtop computers size reductions allowing greater portability and ease of use.

What is required is a system and method that facilitates efficient and relatively even distribution of illumination throughout a display. The system and method should also facilitate clearer presentation of images, size reductions and conservation of limited power resources in handhled computers.

SUMMARY OF THE INVENTION

The present invention system and method facilitates efficient and relatively even distribution of illumination throughout a display. The system and method also facilitates clearer presentation of images, size reductions and conservation of limited power resources in handheld computers. In one embodiment of the present invention, a display illumination distribution system includes a light pipe, a lens, a wave guide array and a light source. The light source provides light waves that are directed along the wave guide array to the lens which direct the light waves into a light pipe included in a display module. The routing of light through the wave guide array confines the light waves to a wave guide and reduces the number of light waves that miss the light pipe. In one embodiment of the present invention the interior walls of each wave guide comprise a highly reflective material that reflects light waves down the length of the wave guide with minimal light loss due to absorption. In one embodiment of the present invention, the display illumination distribution system and method directs visible light waves through a wave guide array to multiple points along the edge of a light pipe included in the display module and provides more effective distribution of light into the light pipe.

BRIEF DESCRIPTION OF THE DRAWINGS

FIG. 3B illustrates the bottom side of one embodiment of a hand held or palmtop computer system.

DETAILED DESCRIPTION OF THE INVENTION

Reference will now be made in detail to the preferred embodiments of the invention, a system and method to illuminate a personal digital assistant display, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Figure 1:
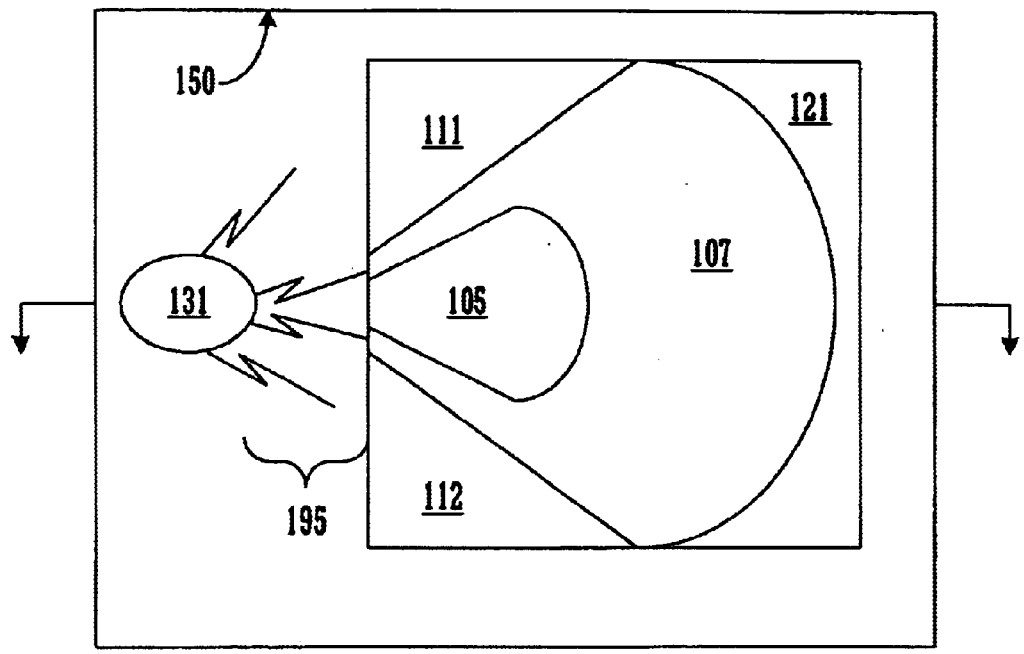
FIG. 1 is a top view of prior art display illumination pattern.
Figure 1:
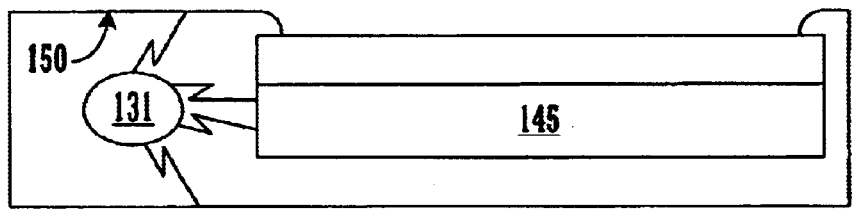
Figure 2A:
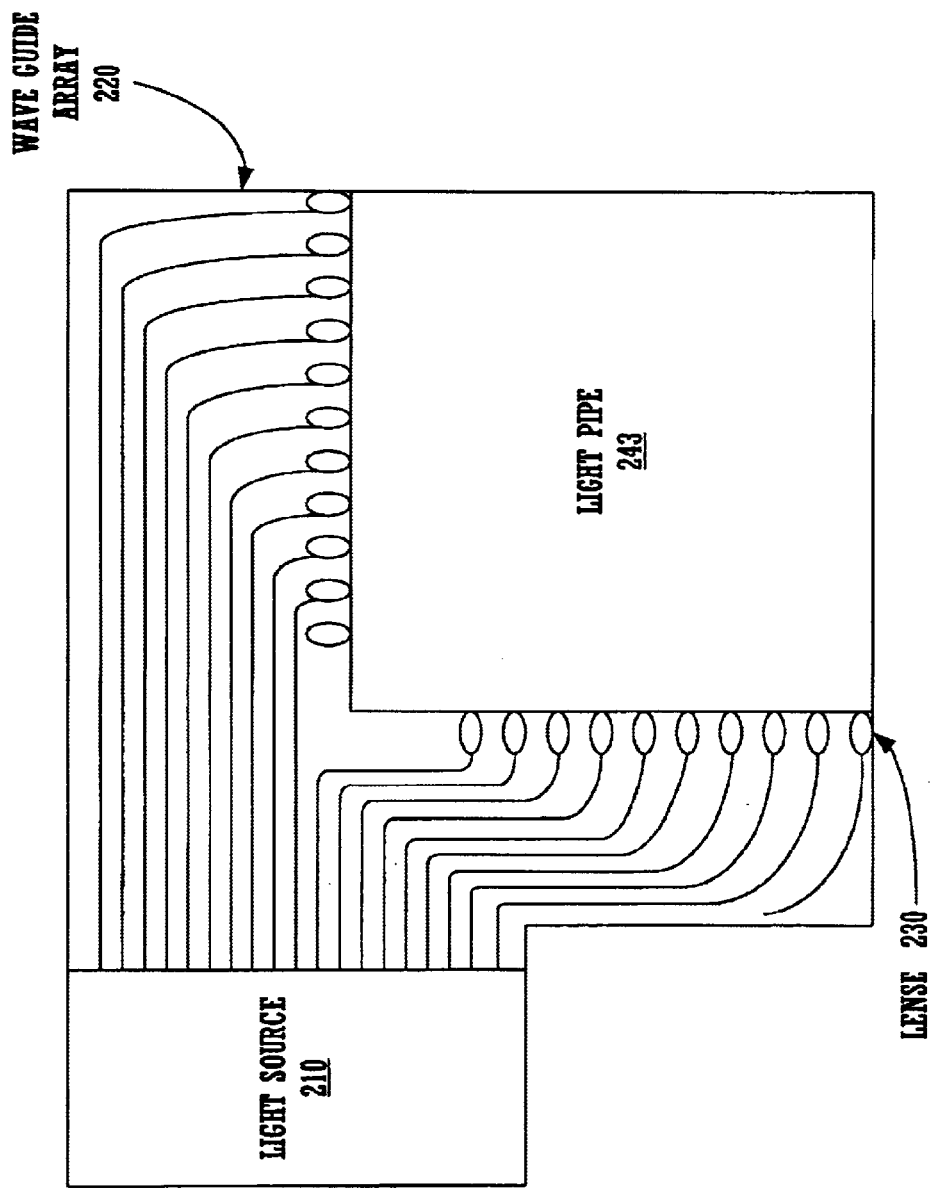
FIG. 2A is a top view of a block diagram of a display illumination distribution system, one embodiment of the present invention.
Figure 2B:
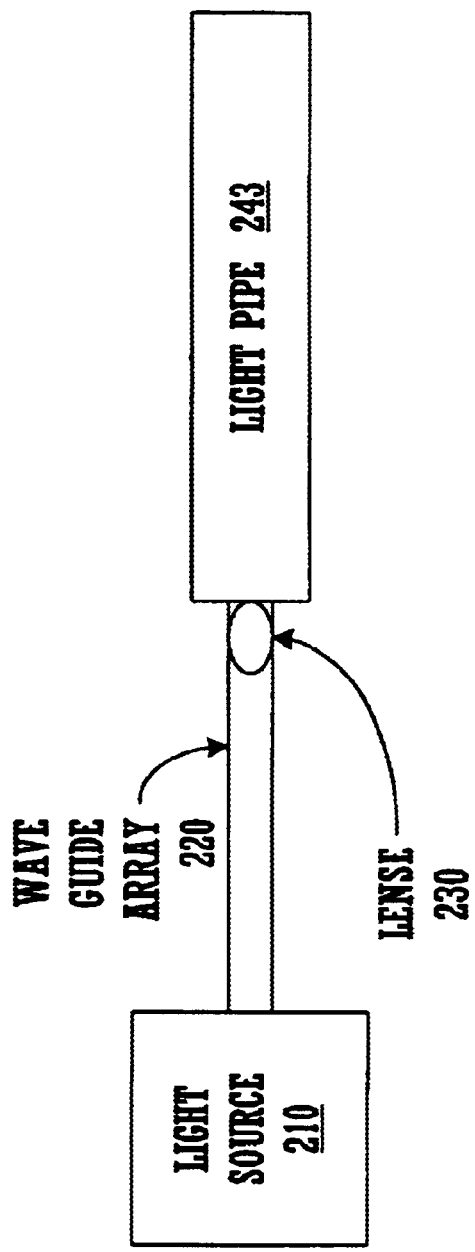
FIG. 2B is a side view of a block diagram of a display illumination distribution system, one embodiment of the present invention.
Figure 2C:
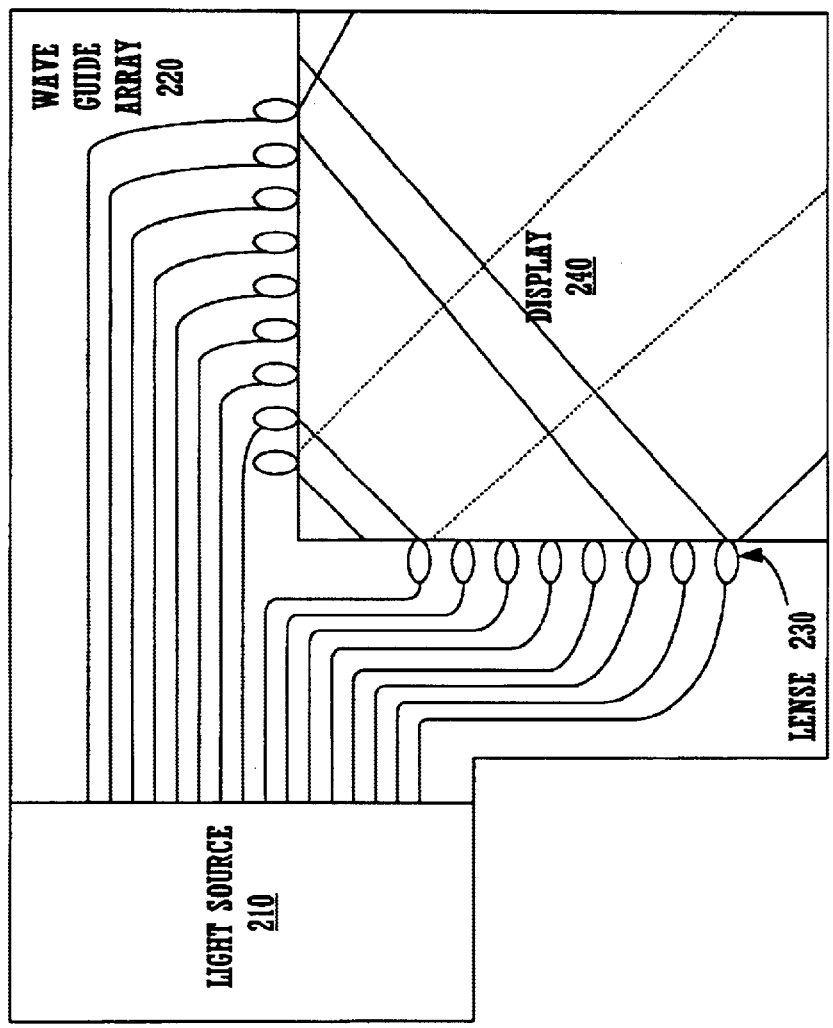
FIG. 2C is a top view of a present invention display illumination pattern.
Figure 2D:
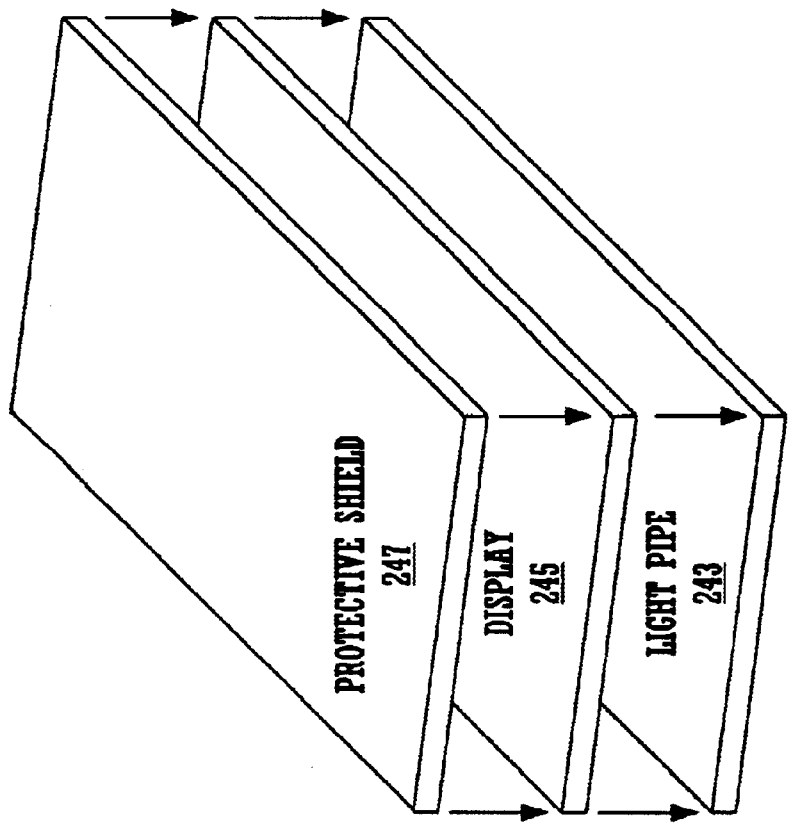
FIG. 2D is block diagram illustrating one exemplary implementation of a display illumination distribution system comprising a light pipe, display and optional protective shield.

FIG. 2A is a top view and FIG. 2B is a side view of a block diagram of display illumination distribution system 200, one embodiment of the present invention. Display illumination distribution system 200 comprises light source 210, wave guide array 220, lens 230 and light pipe 243. Light source 210 provides light to wave guide array 220. Wave guide array 220 includes a plurality of wave guides (e.g., in a fishbone patten) each directing light waves from light source 220 to a lens (e.g., lens 230). The lens directs the light waves into light pipe 243 for distribution of the light waves throughout the light pipe and conveyance by light pipe 243 to a display. FIG. 2D is block diagram illustrating one exemplary implementation of display illumination distribution system 200 comprising light pipe 243, display 245 and optional protective shield 247. In one embodiment of the present invention, display 245 is the component that has the information for actively displaying an image on it and in one exemplary implementation includes filters and polarizers. Protective shield 247 protects display 245 from physical damage.

The components of display illumination distribution system 200 cooperatively operate to facilitate efficient distribution of light. The routing of light through wave guide array 220 confines the light waves to the wave guide and provides more effective distribution of light waves into light pipe 243. By confining the light waves to the wave guide array 220 less light waves are wasted (e.g., miss the light pipe) and absorbed by relatively non reflective materials (not shown) surrounding the display module. In one embodiment of the present invention the interior walls of each wave guide comprise a highly reflective material that reflects light waves down the length of the wave guide with minimal light loses due to absorption.

The light waves are directed to a plurality of points at the edges of light pipe 243 providing more even distribution. FIG. 2C is an illustration of one embodiment of light distribution in display illumination distribution system 200. Not all emissions from the lenses are shown. FIG. 2C shows the overlapping effects and more even distribution of light emitted from lenses at the ends of the wave guide array. Light waves from the intermediate lenses are not shown so as not to obscure the overlapping effects. In one embodiment of the present invention the light waves are distributed from wave guide array 220 so that they form an overlapping grid resulting in an increase in light intensity for the display. For example, wave guide array 220 directs light to a top or bottom side and a right or left side of a light pipe so that some light waves travel in one direction across a light pipe and some travels in another perpendicular direction resulting in a greater intensity of light emitted from the light pipe than if the light waves were just traveling in one direction through the light pipe.

It is appreciated that there are a variety of different implementations of display illumination distribution system 200. For example, light pipe 243 is a backlight as shown in FIG. 2D in one embodiment of the present invention and a frontlight in another embodiment of the present invention (not shown). In one embodiment of the present invention there is a single long lens that receives the light waves from wave guide array 120 and directs them onto the light pipe 243. In one embodiment of the present invention, light pipe 243 is a straight through light pipe and in another embodiment light pipe 243 includes microstructures. In one exemplary implementation of the present invention optional protective shield 247 comprises a plastic substrate and in another it is a glass substrate. In yet another embodiment of the present invention the wave guide array and lens direct light to all four sides of light pipe or on one side.

Figure 3A:
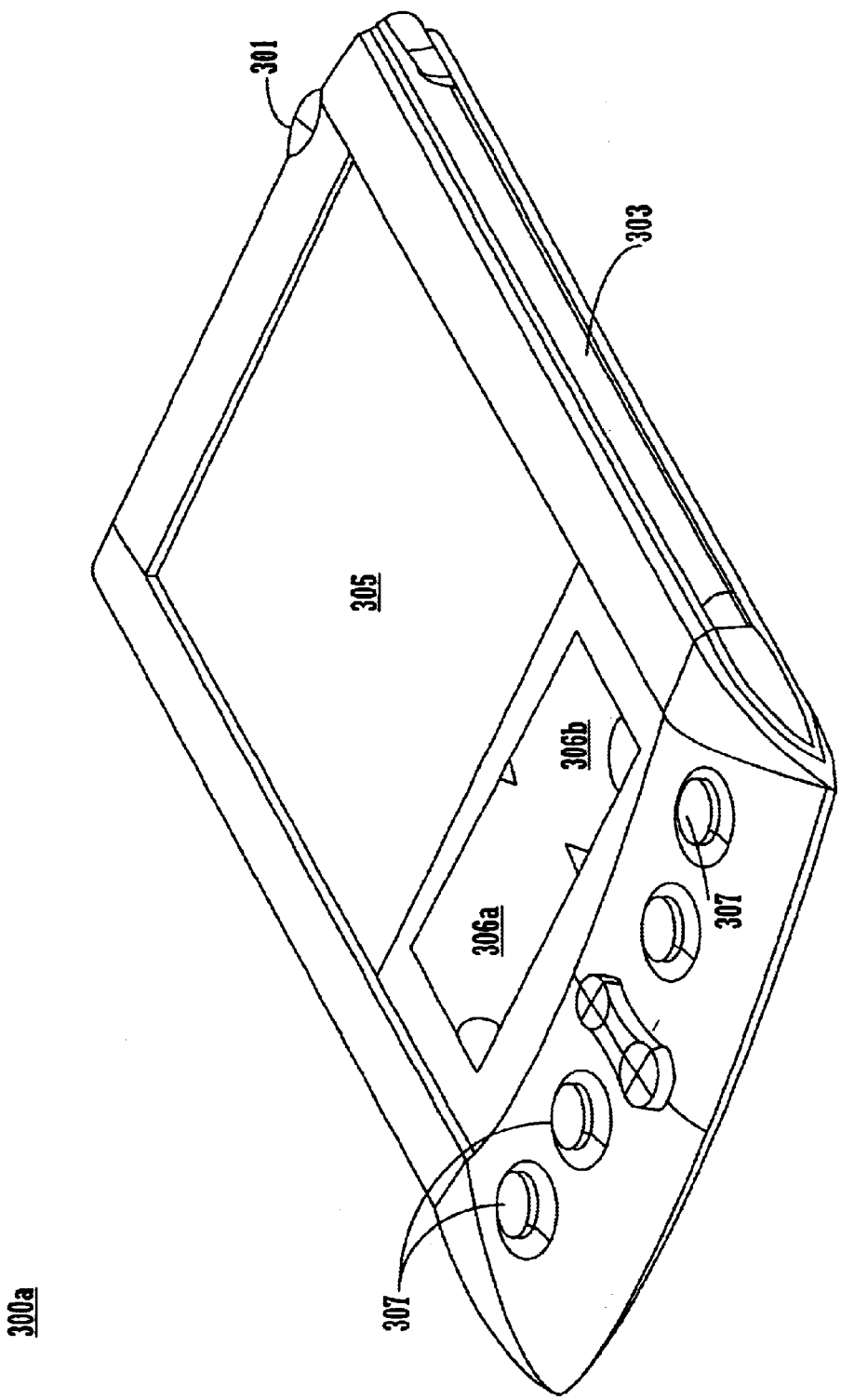
FIG. 3A is a perspective illustration of the top face of one embodiment of a hand held or palmtop computer system.

A display illumination distribution system is flexibly adaptable to a variety of implementations, for example a portable or palmtop computer. FIG. 3A is a perspective illustration of the top face 300a of one embodiment of a hand held or palmtop computer system. The top face 300a includes a display module 305 for displaying images and information to a user. Display module 305 comprises display illumination distribution system 200. Display module 305 also includes an interface board, driver, controller, bezel, a touch screen and support structures in one embodiment of the present invention. The touch screen able to register contact, for example contact between the screen and the tip of the stylus 303 or a finger.

FIG. 3A also illustrates a handwriting recognition pad or "digitizer" containing two regions 306a and 306b. Region 306a is for the drawing of alpha characters therein for automatic recognition and region 306b is for the drawing of numeric characters therein for automatic recognition. A removable stylus 303 and on/off button 301 are also shown. The stylus 303 is used for stroking a character within one of the regions 306a and 306b. The stroke information is then fed to an internal processor for automatic character recognition. Once characters are recognized, they are typically displayed on the screen 305 for verification and/or modification. The top face 300a also includes one or more dedicated and/or programmable buttons 307 for selecting information and causing the computer system to implement functions.

FIG. 3B illustrates the bottom side 300b of one embodiment of a hand held or palmtop computer system. An optional extendible antenna 385, a battery storage compartment door 309, and a serial communication interface 308 are shown. Extendible antenna 385 is utilized for wireless communications (e.g., cellular phone, radio, etc.). Battery storage compartment door 309 provides access for battery replacement. Serial communication interface 308 provides a communication port for communications with peripheral devices (e.g., a palm cradle, landline phone modem, etc.).

Figure 3C:
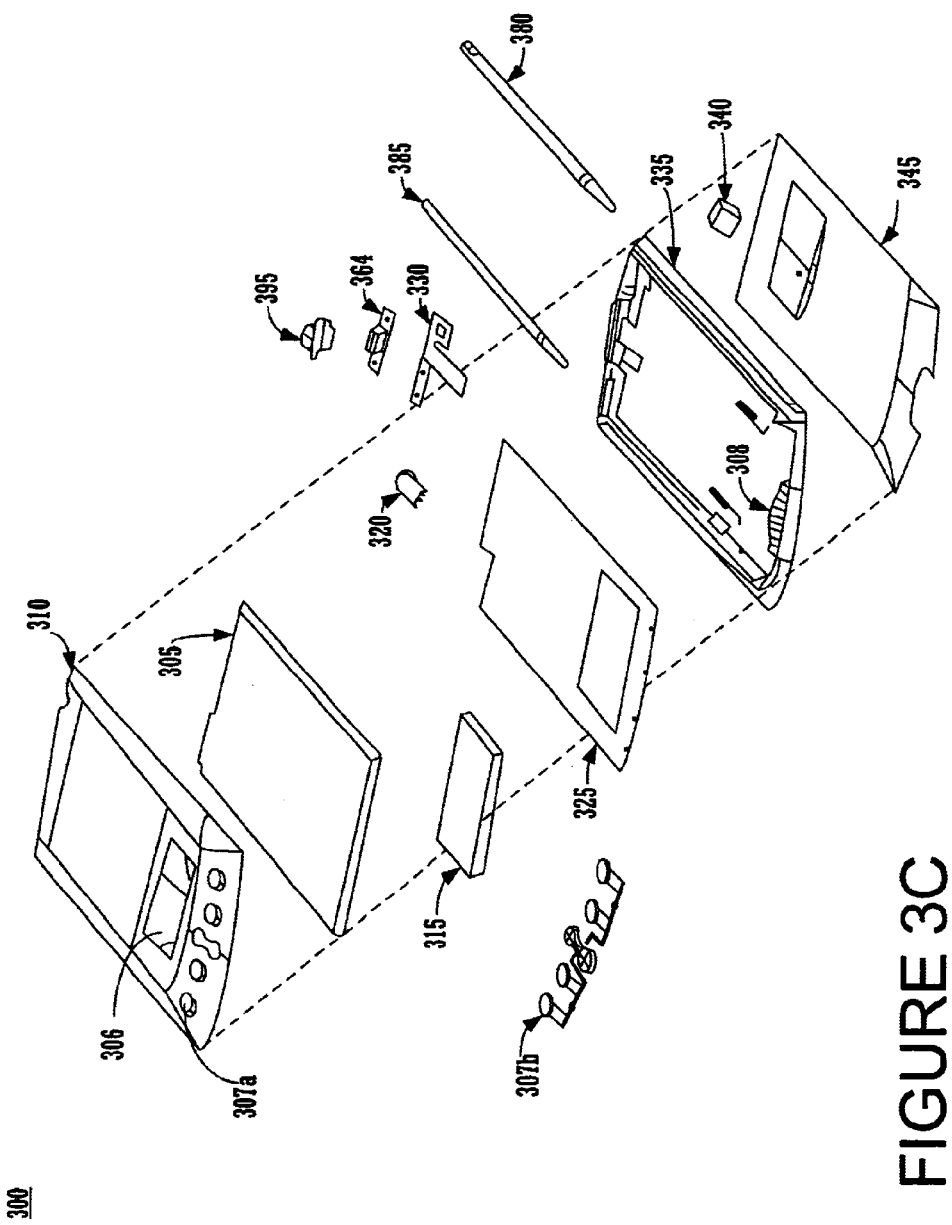
FIG. 3C is an exploded view of a hand held computer system in accordance with one implementation of the present invention.

FIG. 3C is an exploded view of the hand held computer system 300 in accordance with one implementation of the present invention. Hand held computer system 300 includes front cover 310 having an outline of region 306 and holes 307a for receiving buttons 307b. A flat panel display module (e.g., including a liquid crystal display and touch screen) fits into front cover 310. Any of a number of display technologies can be used (e.g., LCD, FED, plasma, etc.) for the flat panel display included in display module 305. A battery 315 provides electrical power. A contrast adjustment (potentiometer) 320 is also shown. On/off button 301 is shown along with an infrared emitter and detector device 364. A flex circuit 330 is shown along with a PC board 325 containing electronics and logic (e.g., memory, communication bus, processor, etc.) for implementing computer system functionality. The digitizer pad is also included in PC board 325. A midframe 335 is shown along with stylus 380.

Hand held computer system 300 is capable of communicating with other devices. Position adjustable antenna 385 for transmitting and receiving communication signals is shown. A radio receiver/transmitter device 340 is also shown between the midframe and the rear cover 345 of FIG. 3. The receiver/transmitter device 340 is coupled to the antenna 385 and also coupled to communicate with the PC board 325. In one implementation of the present invention, the Mobitex wireless communication system is used to provide two way communication between system 300 and other networked computers and/or the Internet via a proxy server. Communication interface 308 is coupled to PC board 325 and provides a communications port (e.g., a serial port) for communicating signals to and from a peripheral device.

Figure 4:
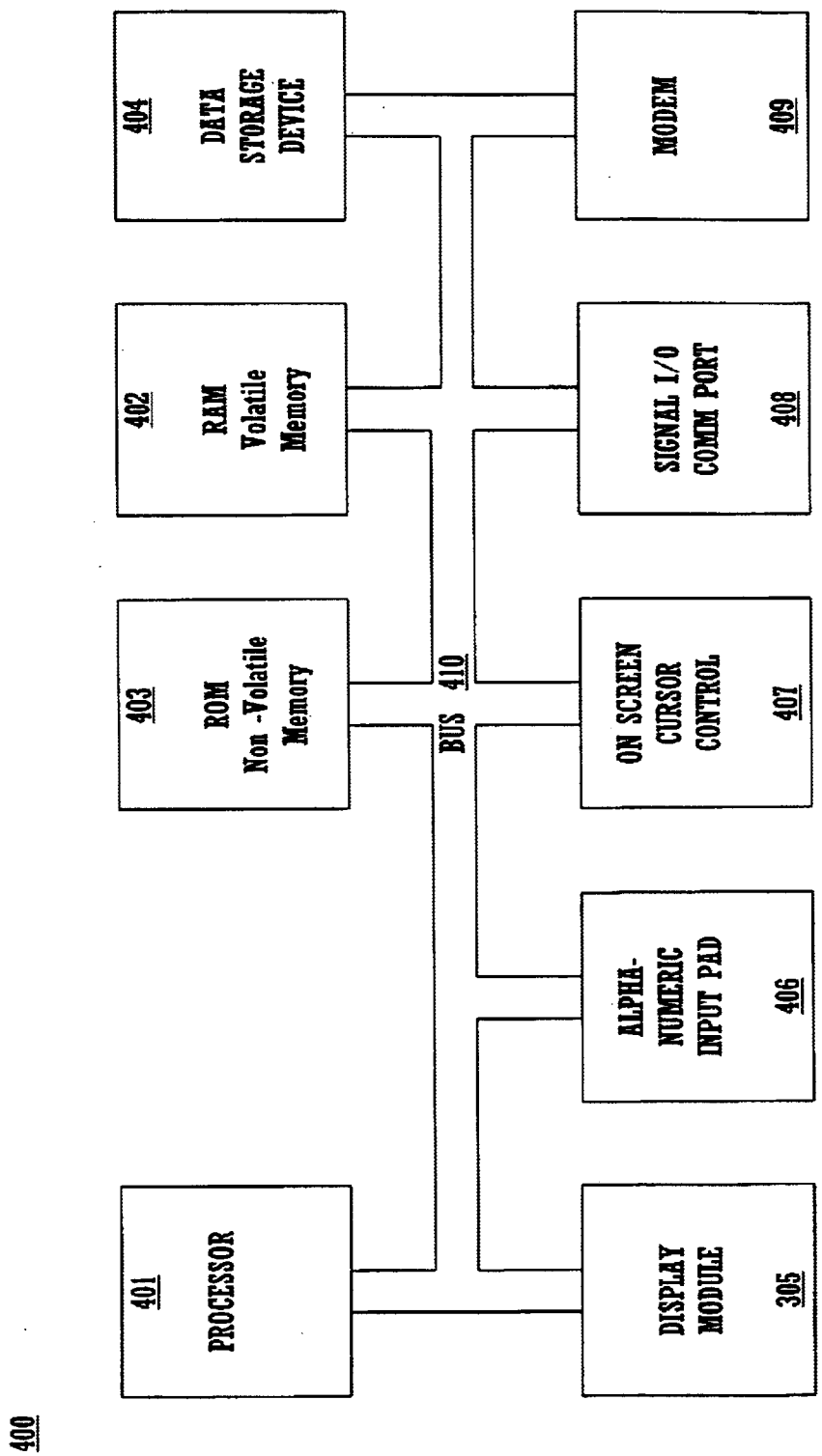
FIG. 4 is a block diagram of a computer system included in one embodiment of the present invention.

FIG. 4 is a block diagram of computer system 400, some of which is implemented on PC board 325. Computer system 400 includes address/data bus 410, central processor 401, volatile memory 402 (e.g., random access memory RAM), non-volatile memory 403 (e.g., read only memory ROM), optional removable data storage device 404 (e.g., memory stick), display module 305 (including wave guide array 220 and light pipe 243), optional alphanumeric input device 406, optional cursor control or directing device 407, and signal communication port 408, modem 409. Address/data bus 410 is coupled to central processor 401, volatile memory 402 (e.g., random access memory RAM), non-volatile memory 403 (e.g., read only memory ROM), optional removable data storage device 404 (e.g., memory stick), display module 305, optional alphanumeric input device 406, optional cursor control or directing device 407, and signal communication port 408, modem 409.

The components of computer system 400 cooperatively function to provide a variety of functions, including PIM, communications, etc. Address/data bus 410 communicates information, central processor 401 processes information and instructions, volatile memory 402 (e.g., random access memory RAM) stores information and instructions for the central processor 401 and non-volatile memory 403 (e.g., read only memory ROM) stores static information and instructions. Optional removable data storage device 404 (e.g., memory stick) also stores information, and instructions. Display module 305 displays information to the computer user and an optional alphanumeric input device 406 is an input device, which in one implementation is a handwriting recognition pad ("digitizer") having regions 306a and 306b (see FIG. 3A). Optional directing device 407 also communicates user input information and command selections to the central processor 401 via a touch screen capable of registering a position on the screen of display module 305 where the stylus makes contact. Signal Communication port 408 is a communication interface (e.g., serial communications port 308) for communicating signals to and from a coupled peripheral device (not shown). Modem 409 facilitates communications with other devices.

Figure 5A:
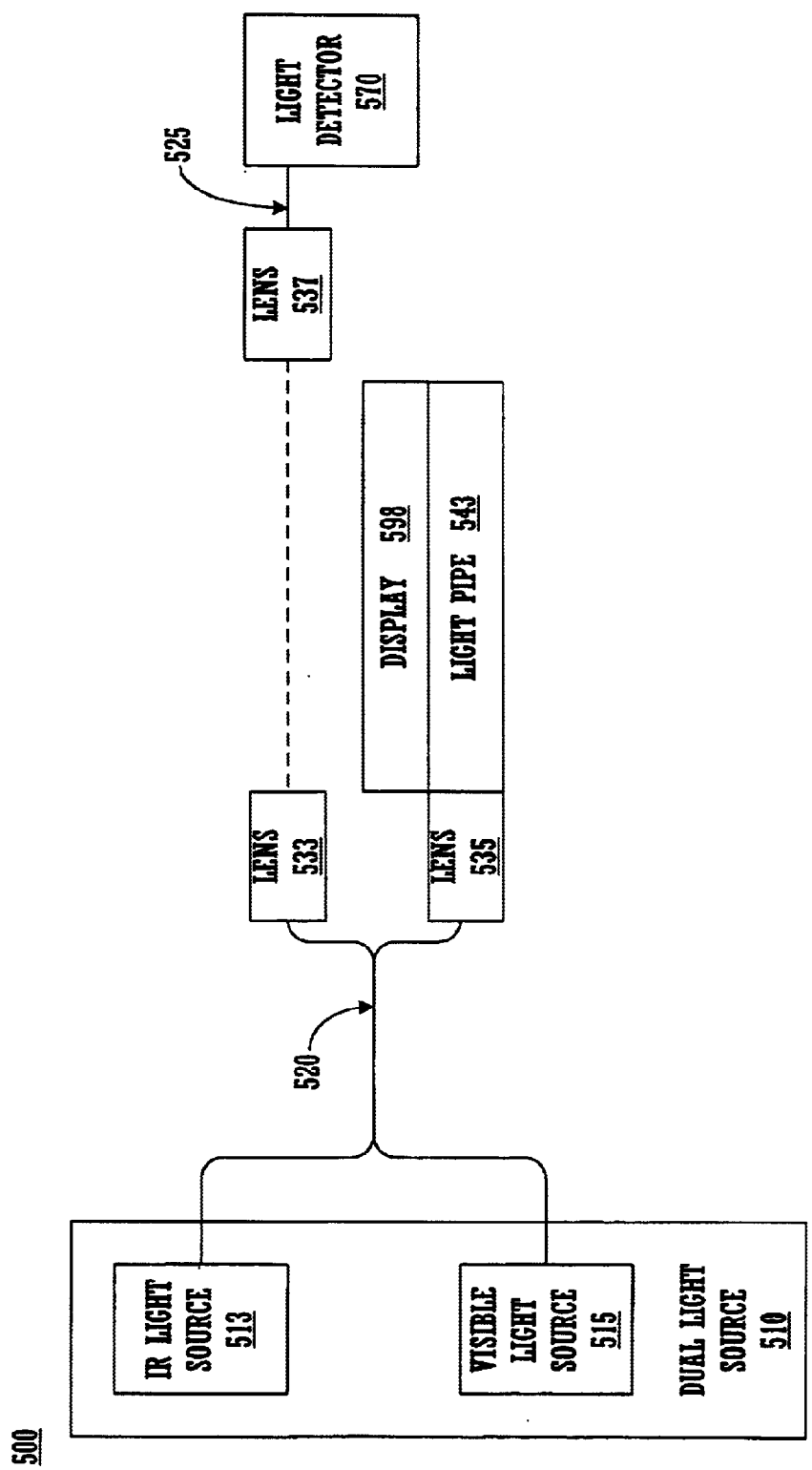
FIG. 5A is a side view of a block diagram of another embodiment of a present invention display illumination distribution system.
Figure 5B:
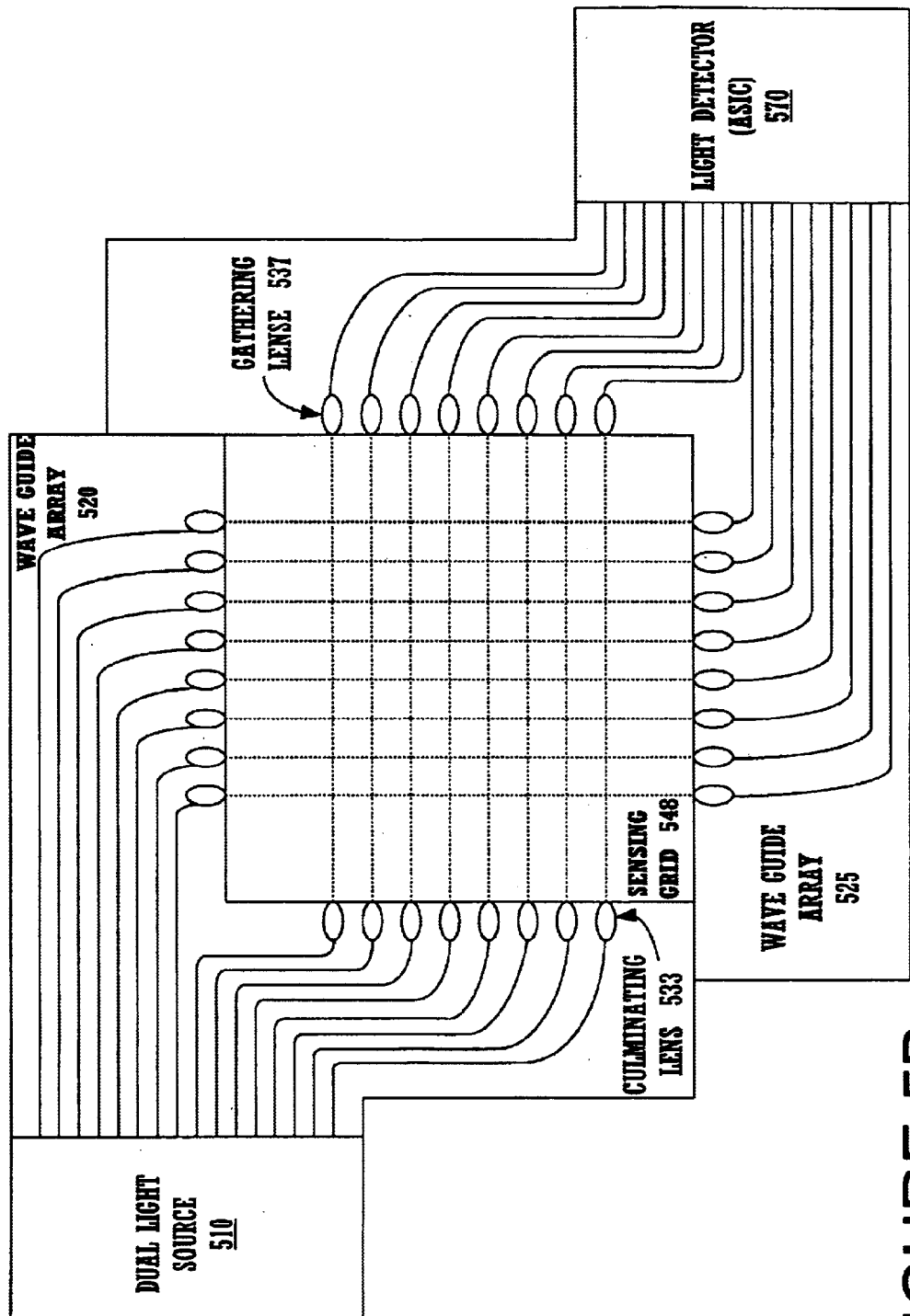
FIG. 5B is a top view of a block diagram of another embodiment of a present invention display illumination distribution system.

FIG. 5A is a side view and FIG. 5B is a top view of a block diagram of display illumination distribution system 500, one embodiment of the present invention. Display illumination distribution system 500 is similar to display illumination distribution system 200 except display illumination distribution system 500 includes additional user input features. In one embodiment of the present invention, display illumination distribution system 500 is implemented in palm held computer system 300. Display illumination distribution system 500 comprises dual light source 510, wave guide array 520, culminating lenses (e.g., culminating lens 533), gathering lenses (e.g. gathering lens 537), wave guide array 525, light detector 570, distribution lenses (e.g., distribution lens 535), light pipe 543 and display 598.

Dual light source 510 provides two different types of light (e g., sensory light waves and illumination light waves) to wave guide array 520. In one embodiment of the present invention, the two different types of light are non interfering types of light. In one exemplary implementation of the present invention, one type of light is a sensory light such as infrared (IR) light and the other type of light is a visible light such as white light from a light emitting diode (LED). In one embodiment of the present invention, light source 510 comprises IR light source 513 and visible light source 515. Wave guide array 520 includes a plurality of wave guides (e.g., in a fishbone pattern) each directing light waves from light source 520 to a lens. Wave guide array 525 also includes a plurality of wave guides (e.g., in a fishbone pattern) each directing light waves from a gathering lens to light detector 570. Similar to light pipe 243, light pipe 543 distributes and emits light for illuminating display 598.

The sensory light waves from the sensory light source (e.g., IR light source 513) are directed in waveguide 520 to culminating lenses (e.g., culminating lens 533) and distributed above the display in a grid pattern (e.g.. sensing grid 548) from the cumulative lenses across to the gathering lenses (gathering lens 537). If a sensory light wave grid is broken then light detector 570 senses the break in the light wave and interprets it as a user input. In one embodiment of the present invention, a user places an object (e.g., a finger or stylus) in a position that blocks or breaks the sensory light waves at a particular location in the grid. The location is associated with certain input information (e.g., an icon) and by analyzing which row(s) and column(s) of sensory light waves are interrupted, light detector 570 determines the location of the interruption and thus the input information selection.

Figure 5C:
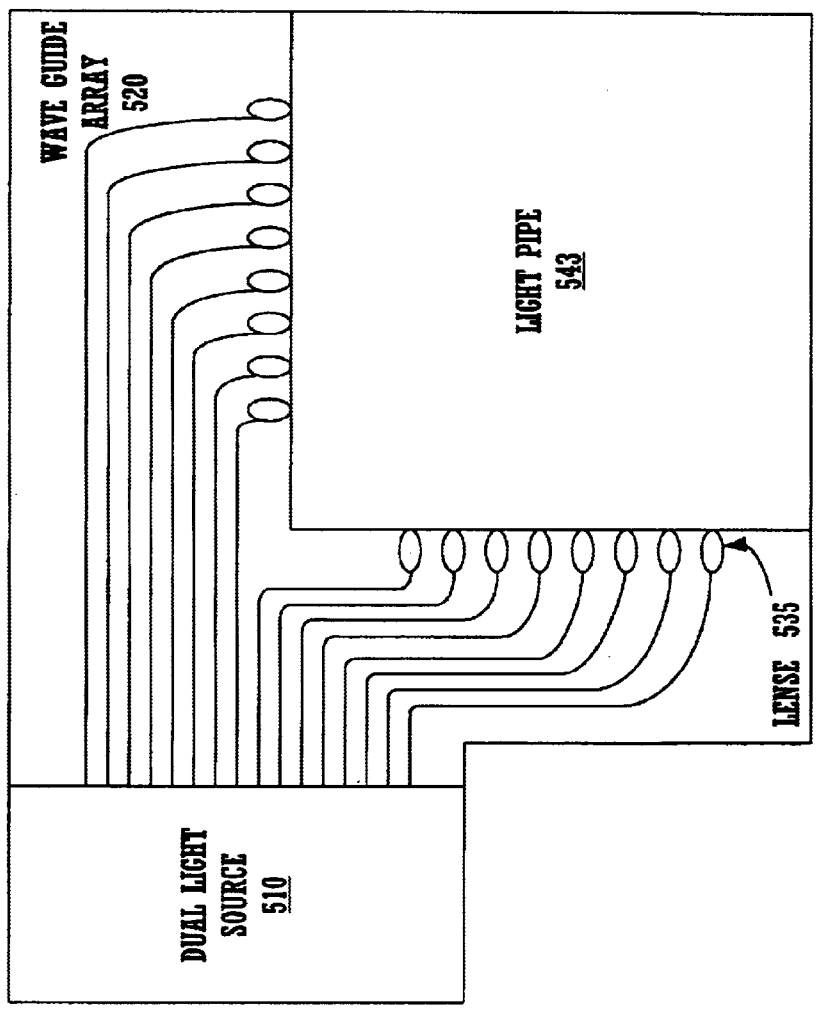
FIG. 5C is a is a top view of a block diagram of a display illumination distribution system at the pipe light level.

FIG. 5C is a is a top view of a block diagram of display illumination distribution system 500 at the pipe light level. Similar to waveguide 220, the visible light is also diverted through wave guide array 520 providing more effective distribution of light waves emanating from the distribution lenses (e.g., distribution lens 535). For example, light wave guides included in wave guide array 520 convey light to the distribution lenses with greater intensity because the walls of the wave guides confine the light waves to a restricted path and they do not dissipate away from the light pipe. Similar to waves guide included in wave guide array 220, the walls of the wave guides included in wave guide array 520 are also constructed of highly reflective material so that a significant portion of the light is reflected along the wave guide path resulting in increased emission at the lens onto the light pipe.

Figure 6A:
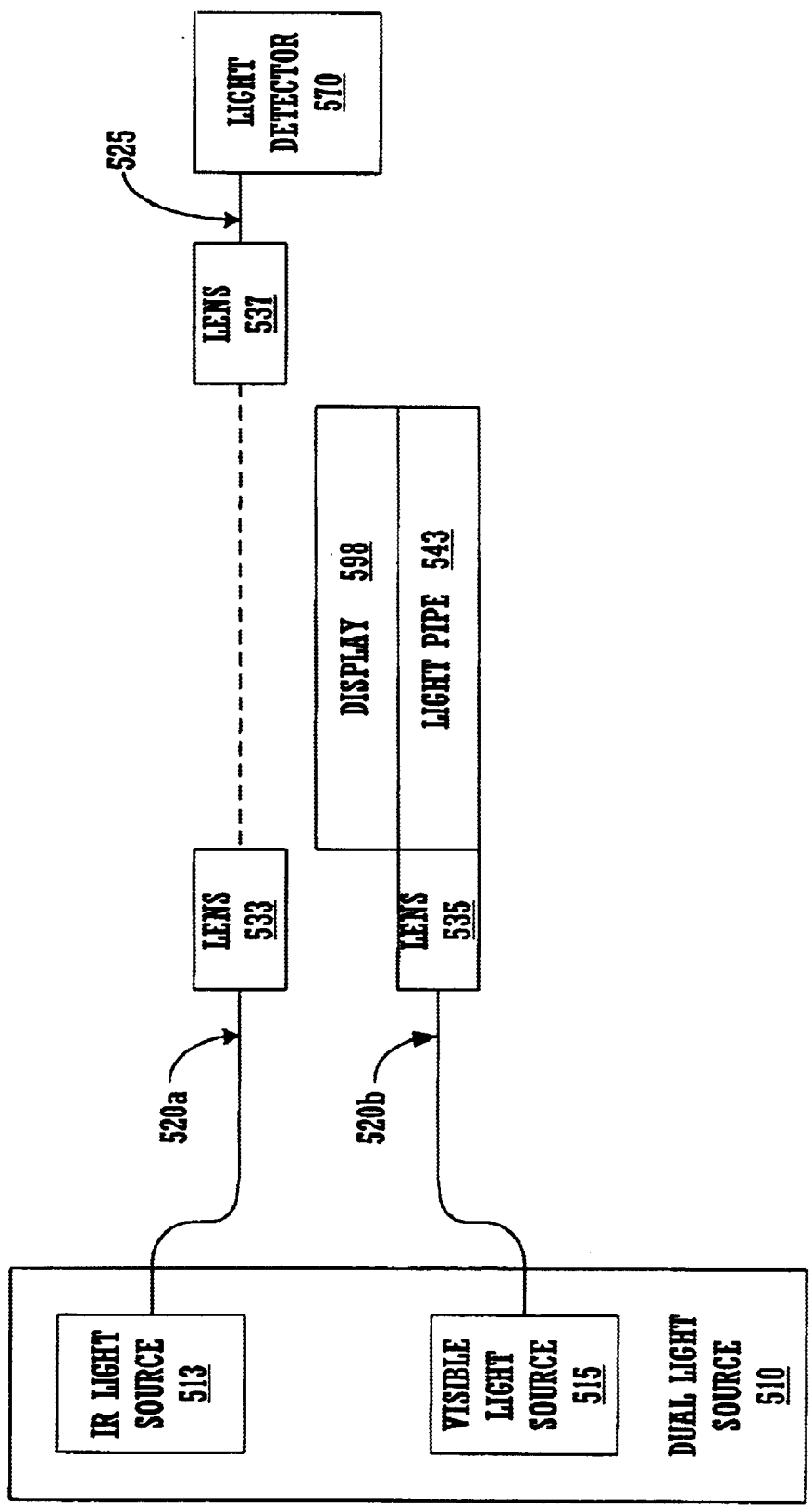
FIG. 6A is a block diagram of one embodiment of the present invention comprising two separate wave guide arrays, one for sensory light and the other for visible light waves.
Figure 6B:
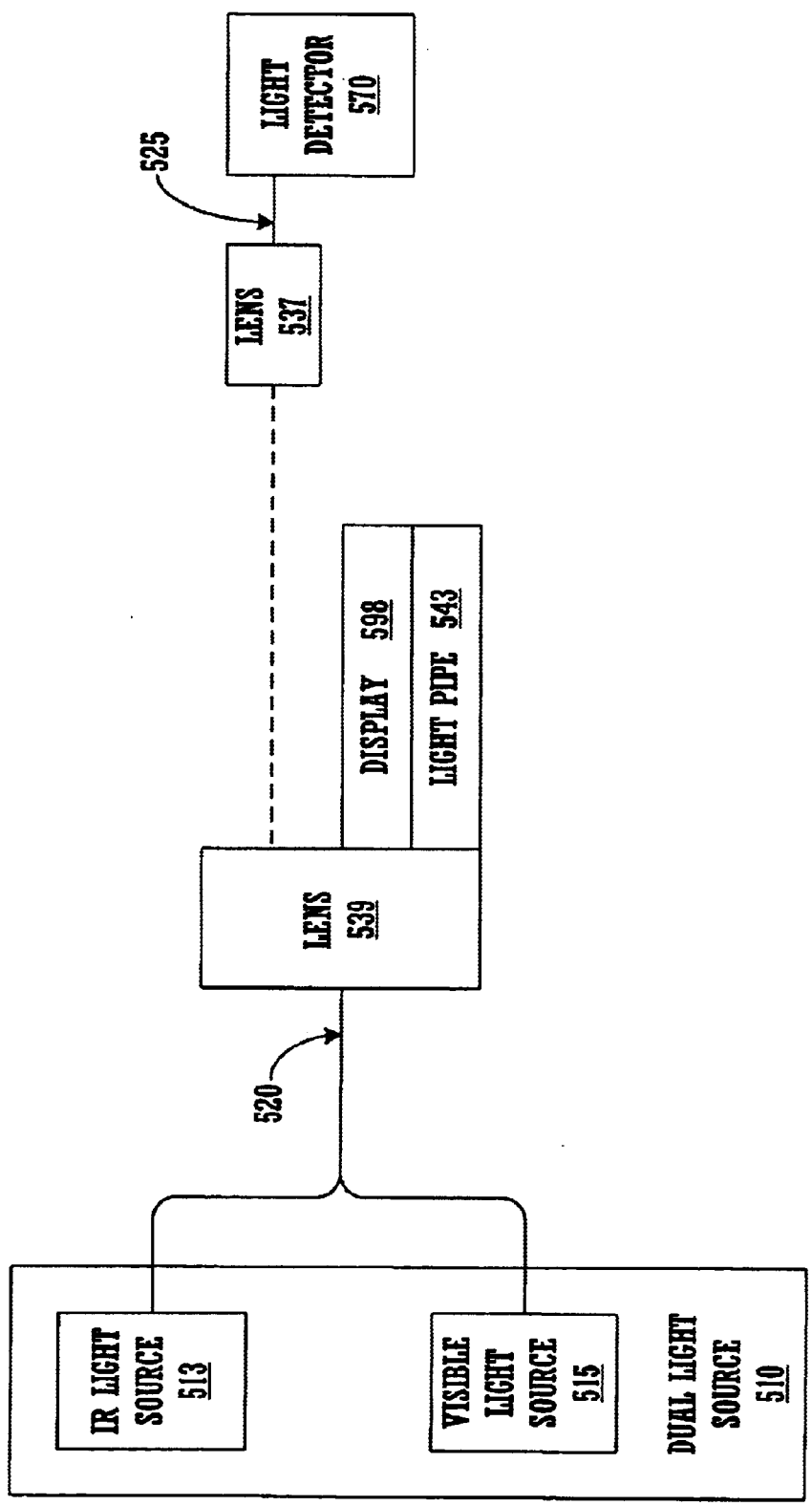
FIG. 6B is a block diagram of one exemplary implementation of the present invention comprising a lens that serves to disperse both the illumination and sensory light waves.

Again, it is appreciated that there are a variety of different implementations of display illumination distribution system 500 with implementation flexibility similar to display illumination distribution system 200. For example, some embodiments of display illumination distribution system 500 have a straight through light pipe and some embodiments of light pipe 543 include microstructures, in some embodiments protective shield 545 comprises a plastic substrate and in another it comprises a glass substrate. FIG. 6A is a block diagram of one embodiment of the present invention comprising two separate wave guide arrays, one for sensory light (e.g., waveguide array 520A) and the other for visible light waves (e.g., wave guide array 520B). FIG. 6B is a block diagram of one exemplary implementation of the present invention comprising a lens (e.g., lens 539) that serves to disperse both the illumination and sensory light waves.

Figure 7:
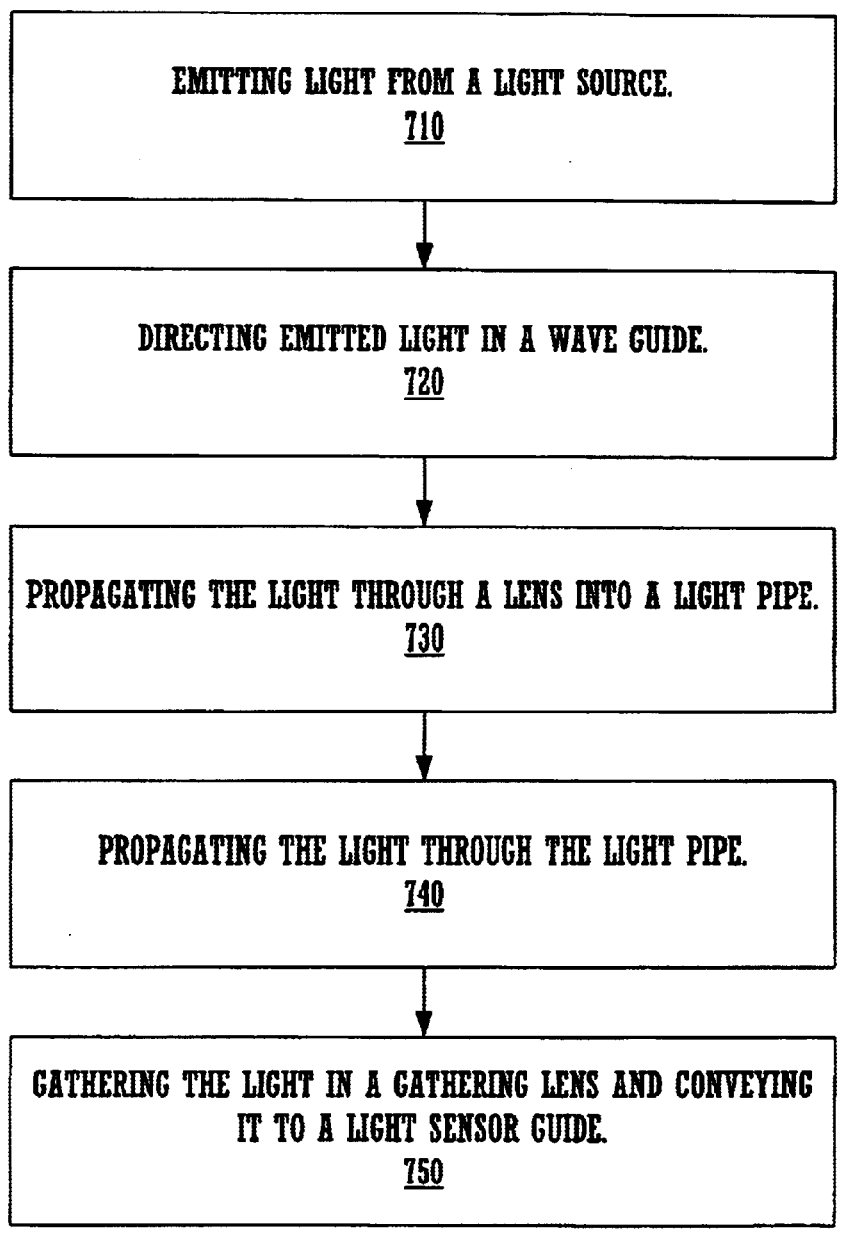
FIG. 7 is a flow chart of a display illumination distribution method, one embodiment of the present invention.

FIG. 7 is a flow chart of display illumination distribution method 700, one embodiment of the present invention. Display illumination distribution method 700 facilitates efficient and even distribution of illumination for a display screen. Display illumination distribution method 700 enables greater intensity of illumination with a smaller light source and reduced consumption of energy resources.

In step 710 light is emitted from a light source. In one exemplary implementation the light is visible light. In one embodiment of the present invention two different types of light are emitted. For example, noninterfering light waves such as a sensory light waves (e.g., IR) and visible light wave (e.g., white light from an LED) are emitted.

In step 720 the emitted light is directed in a wave guide. In one embodiment of the present invention the light waves are reflected off the walls of the wave guide. In one exemplary implementation, the emitted light is directed through a plurality of wave guides included in a wave guide array.

In step 730 the light is propagated through a lens into a light pipe. In one embodiment of the present invention the lens act as a cumulating lens. One exemplary implementation of the present invention includes a plurality of lenses.

In step 740 the light is conveyed to a display. In one exemplary implementation of the present invention, a portion of the light wave is emitted from the light pipe and another portion is conveyed down the light pipe for emission at a different location in the light pipe.

In step 750 light is gathered in a gathering lens and conveyed to a light sensor via a wave guide. In one exemplary implementation the present invention, breaks in the sensory light are detected by the light sensor.

Thus, the present invention system and method facilitates efficient illumination of a display screen and a readily viewable presentation of images. The display illumination distribution system and method of the present invention facilitates relatively even distribution of illumination throughout a display screen while assisting energy conservation. The present invention also facilitates size reduction requirements of a handheld computer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A display illumination distribution method comprising:
emitting two different types of light from a light source, including a sensory light and a visible light;
directing said light in a wave guide;
propagating said light through a lens into a light pipe;
emitting a portion of said light from said tight pipe;
conveying another portion of said light down said light pipe for emission at a different location in said light pipe; and
conveying said light to a display.

2. The display illumination distribution method of claim 1 further comprising the step of reflecting light waves off the walls of the wave guide.

3. The display illumination distribution method of claim 1 further comprising the steps of:
gathering said sensory light waves in a gathering lens; and
conveying said sensory light waves to a light sensor via a wave guide.

4. The display illumination distribution method of claim 3 further comprising the step of detecting breaks in the sensory light.

5. A handheld computer display illumination distribution system comprising:
a display for displaying an image;
a light pipe for distributing illumination light waves to said display, said light pipe coupled to said display;
a distribution lens for directing said illumination light waves, said distribution lens coupled to said light pipe;
a wave guide array for directing said illumination light waves to said distribution lens, said wave guide coupled to said distribution lens;
a light source for providing said illumination light waves and sensory light waves, said light source coupled to said wave guide;
a culminating lens for distributing said sensory light waves above said display in a grid pattern;

a gathering lens for collecting said sensory light waves; and a light detector for detecting a break in said sensory light waves, said light detector coupled to said gathering lens.

6. The handheld computer display illumination distribution system of claim 5 wherein said light source provides non interfering illumination light waves and sensory light waves.

7. The handheld computer display illumination distribution system of claim 5 wherein said sensory light waves are infrared light.

8. The handheld computer display illumination distribution system of claim 5 wherein said illumination light is visible white light from a light emitting diode.

\* \* \* \* \*